A. CRUMBIE.
Bakers' Ovens.

No. 150,295. Patented April 28, 1874.

Fig. 1.

Fig. 2.

Witnesses
John Becker
Fred Hoyner

Alexander Crumbie
by his attorneys
Brown & Allen

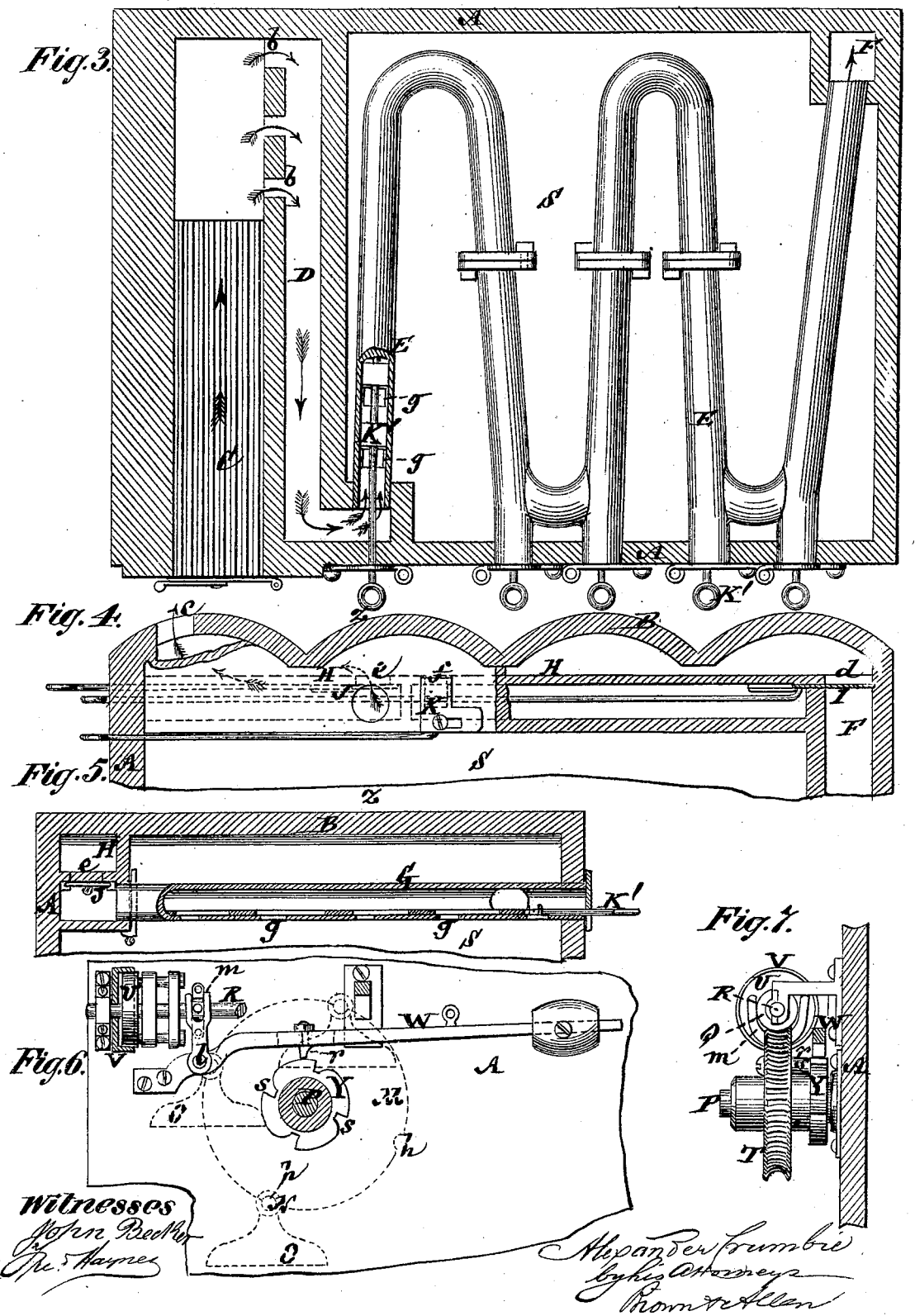

UNITED STATES PATENT OFFICE.

ALEXANDER CRUMBIE, OF BROOKLYN, NEW YORK.

IMPROVEMENT IN BAKERS' OVENS.

Specification forming part of Letters Patent No. 150,295, dated April 28, 1874; application filed March 26, 1874.

*To all whom it may concern:*

Be it known that I, ALEXANDER CRUMBIE, of the city of Brooklyn, in the county of Kings and State of New York, have invented certain Improvements in Bakers' Ovens, of which the following is a specification:

Although the invention will here be described as applied to a mechanical oven for bakers' use, in which a traveling endless chain of pendent bread-holders is used, and one part of the invention is more particularly applicable to such construction of oven, the invention is not wholly restricted thereto, and one portion of it is applicable to any kind of oven. The invention consists in a construction of interior flues, by which the heat is conveyed into the oven, with the outlets for dissemination of the heated air made in the bottoms or under sides of the flues, whereby the heat is carried into the oven without any addition of gas, smoke, or dust, so that the material baking is subjected to the action of pure hot air only, and is not made offensive by the action of gases or the admixture of ashes or coal-dust, but is allowed to retain its natural sweet and wholesome flavor. The invention also comprises a novel arrangement of flues and dampers for regulation of heat within the oven; likewise an improved automatic stop mechanism and friction-clutch-driving mechanism for stopping and starting or running the endless chain of bread-holders, and arresting the same at the necessary point for charging and discharging them.

In the accompanying drawing, Figure 1 represents an exterior side elevation of an oven having my improvements applied; Fig. 2, a sectional plan of the same on the line $w\ w$; Fig. 3, a horizontal section on the irregular line $x\ x$; Fig. 4, longitudinal vertical section of the upper part on the irregular line $y\ y$; Fig. 5, a transverse vertical section on the line $z\ z$; Fig. 6, a side view, in part, in illustration of the driving and stop mechanism; and Fig. 7, an end view of the same.

A are the outside walls of the oven, and B its arched or waved top. C is the furnace, from which the products of combustion pass through outlets $b$ into a lower return-flue, D, from which they are conducted into a horizontal zigzag arrangement of pipes or flues, E, within the lower portion of the interior of the baking-chamber S, said flues being connected by return-elbows and connections, and disposed in a serpentine course across the bottom of the oven throughout its length, and connecting at the rear end of the oven on its one side with an upright flue, F. This flue F connects in its turn either with an upper interior arrangement of zigzag flues, G, similar, as regards construction, to the flues E, but conducting the heated air from back to front of the oven, or with an upper horizontal flue, H, accordingly as it is required to circulate the heated gases within the upper portion of the oven, or to pass them off direct to the general outlet or take-up, $c$, with which the flue H connects. Apertures $d\ e$ serve the one ($d$) to establish communication between the upright flue F and the outlet-flue H, and the other aperture ($e$) to connect the outlet end of the upper interior system of flues G with the same flue H, and separate dampers I J are applied to these apertures $d\ e$ to control them as required, the one usually being open when the other is closed, accordingly as it is required to pass off the products of combustion direct to the take-up after circulating through the flues E and F, or circulating them again through the oven by the flues G, to suit various requirements as regards top and bottom baking heat.

Furthermore, the distribution of the heat to the interior of the oven equally above and below, or more either in the upper or lower portions, may be regulated by dampers in the interior flues arranged to control apertures in the latter for dissemination of the heated air within the baking-chamber to effect the baking by the direct application of the heated air or gases, which is the principle—in part, at least—the oven is designed to work upon. This will be hereinafter more particularly described in connection with a particular disposition of the outlets in the interior flues, whether of a zigzag construction or not, and whether arranged both above and below, or either. There is another damper, K, controlling an aperture, $f$, for cooling the oven, when required, by establishing direct connection between the interior of the baking-chamber and the flue H.

To prevent gas, smoke, and coal-dust from entering the baking-chamber along with the heated air disseminated through apertures in the interior flues, the latter are made with their distributing-apertures along or in the bottoms of the flues. Thus the flues E and G, which permeate the interior of the oven, have their distributing-apertures $g$ controlled by dampers K' in the under side of the flues, whereby the smoke and obnoxious gases, being lighter than the air, will occupy the upper portions of said flues and pass off along with any coal-dust by the draft, while the heated air escapes through the apertures $g$ into the baking-chamber. By closing the dampers K' only the heat radiated from the interior pipes or flues is utilized. This method of distributing the hot air into the baking-chamber is applicable to various mechanical and other ovens.

The endless traveling chain of pendent bread-holders represented in the drawing, and which is superior to a reel, inasmuch as the oven may be less elevated, and is otherwise preferable, consists of duplicate chains L L, arranged on either side of the baking-chamber, between the upper and lower interior or heat-distributing flues, and passing round notched pulleys M M, with the notches $h$ of which the cross-shafts N, that carry the loose or pendent bread-holders O, gear. The shaft P of one pair of these pulleys at the front end of the oven is the driver, and extends through the one side of the oven. It is operated by a screw, Q, on an independent shaft, R, gearing with a worm-wheel, T, on the shaft P, the screw-shaft R deriving its motion by a friction-clutch, U, when pressed or borne up within a loose pulley, V, on which is the driving-belt. Such motion is intermittent, to arrest the bread-holders as they successively come in position opposite and in proximity to the charging and discharging opening $k$ of the oven. This is automatically effected as follows: The driving friction-clutch U, which is preferably of adjustable construction, by means of screws and suitable backs or supports, is fitted to turn with the shaft R, but free to slide thereon or with it, to provide for the clutch's engagement with or disengagement from the loose pulley V. It is held in contact with the loose pulley, to effect the driving of the chain of pendent bread-holders, by the elevation of a weighted lever, W, which has its fulcrum at $l$, and acts upon the clutch through a jaw-shaped arm, $m$. This lever may be held raised to continue the motion of the endless chain of bread-holders in the oven by means of a hand or foot lever, $n$, and chain $o$, passing over suitable guides or pulleys. When required to arrest the travel of the bread-holders the lever $n$ is released, and the weighted lever W left free to drop, so soon as one of a series of notches in a disk, Y, fast to the shaft P comes round under a toe, $r$, preferably made adjustable, on the weighted lever, said toe falling into the notch, and the weighted lever W in dropping releasing the friction-clutch U from the pulley V, and so stopping the travel of the bread-holders; or this stoppage is wholly automatic each time a notch, $s$, in the disk Y comes under the toe $r$ of the weighted lever that, when resting on the plain or unnotched portion of the disk Y, holds the friction-clutch in driving contact with the loose pulley V, and each time it is required to start the bread-holders the lever $n$ is simply depressed to lift the toe $r$ out of its notch in the disk, and to put the friction-clutch in gear. The notches $s$ in the disk Y correspond in number and arrangement with the notches in the pulleys M on the same shaft as the disk, and the same are so pitched that the endless chain of bread-holders, when stopped by the means described, will always present a bread-holder to the charging and discharging opening $k$. A very limited number of notches, $s$ and $h$, in the disk Y and pulleys M will ordinarily suffice under this arrangement of parts, thus doing away with much difficulty of adjustment and the complication exhibited in the stop mechanism described in my Patent No. 99,645, dated February 8, 1870.

I claim—

1. In a baker's oven heated by the direct introduction within the baking-chamber of the heated air or gases from the furnace, the draft pipes or flues having the openings for distribution of the heated air arranged along their bottoms or under surfaces, substantially as and for the purposes herein set forth.

2. The combination of upper and lower hot-air-distributing pipes within the baking-chamber, having the distributing-apertures in their bottoms, and dampers for controlling said apertures, essentially as described.

3. The combination, with the baking-chamber S and its furnace C, of the upper and lower hot-air-distributing pipes E G, provided with lower distributing-openings $g$, the dampers K', the up-draft flue F, the horizontal flue H, the apertures $d$ $e$, and the dampers I J, the whole being arranged substantially as and for the purposes specified.

4. The combination, with the endless chain of pendent bread-holders O and their carrying-pulleys M M, of the friction-clutch U, the loose driving-pulley V, the screw Q on the shaft R, the worm-wheel T, the weighted lever W, with its toe $r$ and clutch-operating connection $m$, and the notched disk Y, essentially as and for the purposes herein set forth.

ALEXANDER CRUMBIE.

Witnesses:
 HENRY T. BROWN,
 MICHAEL RYAN.